(12) United States Patent
Pradeepkumar et al.

(10) Patent No.: US 12,451,756 B2
(45) Date of Patent: Oct. 21, 2025

(54) ELECTRIC MACHINE

(71) Applicant: FORD GLOBAL TECHNOLOGIES, LLC, Dearborn, MI (US)

(72) Inventors: Akash Changarankumarath Pradeepkumar, Westland, MI (US); Singar Rathnam, Farmington Hills, MI (US); Joel Hetrick, Ann Arbor, MI (US); Joshua Simon, Sylvania, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 608 days.

(21) Appl. No.: 17/842,514

(22) Filed: Jun. 16, 2022

(65) Prior Publication Data

US 2023/0412037 A1 Dec. 21, 2023

(51) Int. Cl.
*H02K 5/22* (2006.01)
*H02K 3/12* (2006.01)
*H02K 3/28* (2006.01)
*H02K 3/38* (2006.01)
*H02K 11/25* (2016.01)

(52) U.S. Cl.
CPC ............... *H02K 5/225* (2013.01); *H02K 3/12* (2013.01); *H02K 3/28* (2013.01); *H02K 3/38* (2013.01); *H02K 11/25* (2016.01); *H02K 2203/09* (2013.01)

(58) Field of Classification Search
CPC .................................. H02K 3/28; H02K 5/225
See application file for complete search history.

(56) References Cited

U.S. PATENT DOCUMENTS

| 4,689,023 | A * | 8/1987 | Strong, III | H05K 1/029 |
| | | | | 439/189 |
| 8,729,755 | B2 * | 5/2014 | Nakagawa | H02K 5/225 |
| | | | | 310/71 |
| 10,192,652 | B2 * | 1/2019 | Fujiwara | H02K 3/12 |
| 10,727,720 | B2 * | 7/2020 | Kim | H02K 5/22 |
| 10,910,899 | B2 * | 2/2021 | Ishikawa | H02K 1/2706 |
| 2003/0201688 | A1 * | 10/2003 | Yamamura | H02K 3/522 |
| | | | | 310/71 |
| 2005/0253466 | A1 * | 11/2005 | Seguchi | H02K 3/28 |
| | | | | 310/179 |

(Continued)

FOREIGN PATENT DOCUMENTS

| WO | 20216400 A1 | 10/2020 |
| WO | 21239176 A1 | 12/2021 |

*Primary Examiner* — Alexander Talpalatski
(74) *Attorney, Agent, or Firm* — David B Kelley; Brooks Kushman.P.C.

(57) ABSTRACT

An electric machine includes windings, a terminal block, and terminal connectors. The windings have lead ends and neutral ends. The terminal block has a plurality of bus bars, a neutral bar, and an insulating material. Each bus bar is connected to one or more of the lead ends. The neutral bar is connected to one or more of the neutral ends. The insulating material encapsulates the plurality of bus bars and the neutral bar, defines a plurality of orifices, and defines a plurality of slots. Each lead end extends through one of the orifices from the outer boundary to one of the bus bars. Each neutral end extends through one of the orifices from the outer boundary to neutral bar. Each terminal connector extends through one of the slots from the outer boundary to one of the bus bars.

20 Claims, 9 Drawing Sheets

(56) References Cited

U.S. PATENT DOCUMENTS

2006/0091746 A1* 5/2006 Takeuchi .............. H02K 3/522
                                                                       310/67 R
2017/0019000 A1* 1/2017 Sakamoto ................ G01K 1/14
2018/0304835 A1 10/2018 Skalski

* cited by examiner

ELECTRIC MACHINE

TECHNICAL FIELD

The present disclosure relates to electric machines, including motors and/or generators that may be utilized in hybrid and electric vehicles.

BACKGROUND

Hybrid and/or electric vehicles may include an electric machine that is configured to propel the vehicle.

SUMMARY

An electric machine includes hairpin windings, a terminal block, and terminal connectors. The hairpin windings have a plurality of electrical phases. Each electrical phase has a plurality of parallel electrical paths. The terminal block has a plurality of bus bars, at least one neutral bar, and an insulating material. Each bus bar is connected to each parallel electrical path of the one of the electrical phases. The at least one neutral bar is connected to each electrical phase. The insulating material encapsulates the plurality of bus bars and the at least one neutral bar, defines a plurality of ports, and defines a plurality of terminal receiving orifices. Each port extends from a first outer surface of the insulating material to one of the bus bars or the at least one the neutral bar. Each terminal receiving orifice extends from a second outer surface of the insulating material to one of the bus bars. Lead and end hairpins of the hairpin windings each extend through one of the ports from the first outer surface to a corresponding bus bar or a corresponding neutral bar to connect each electrical path to the corresponding bus bar and the corresponding neutral bar. Each terminal connector extends through one of the terminal receiving orifices, is connected to one of the bus bars, and protrudes outward from the second outer surface of the insulating material.

An electric machine includes windings, a terminal block, and terminal connectors. The windings have lead ends and neutral ends. The terminal block has a plurality of bus bars, a neutral bar, and an insulating material. Each bus bar is connected to one or more of the lead ends. The neutral bar is connected to one or more of the neutral ends. The insulating material encapsulates the plurality of bus bars and the neutral bar, defines a plurality of orifices, and defines a plurality of slots. Each orifice extends from an outer boundary of the insulating material to one of the bus bars or the neutral bar. Each slot extends from the outer boundary to one of the bus bars on an opposing side of the insulating material relative to the orifices. Each lead end extends through one of the orifices from the outer boundary to one of the bus bars. Each neutral end extends through one of the orifices from the outer boundary to neutral bar. Each terminal connector extends through one of the slots to one of the bus bars and protrudes outward from the outer boundary on the opposing side of the insulating material.

A terminal block for an electric machine includes bus bars, a neutral bar, and an insulating material. Each bus bar is configured to connect to lead ends of electrical windings. Each neutral bar is configured to connect to neutral ends of the electrical windings. The insulating material encapsulates the bus bars and the neutral bar, defines orifices extending from a first outer surface of the insulating material to one of the bus bars or the neutral bar, and defines slots extending from a second outer surface of the insulating material to one of the bus bars. Each orifice is configured to receive one lead end or one neutral end. Each slot is configured to receive a terminal connector.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
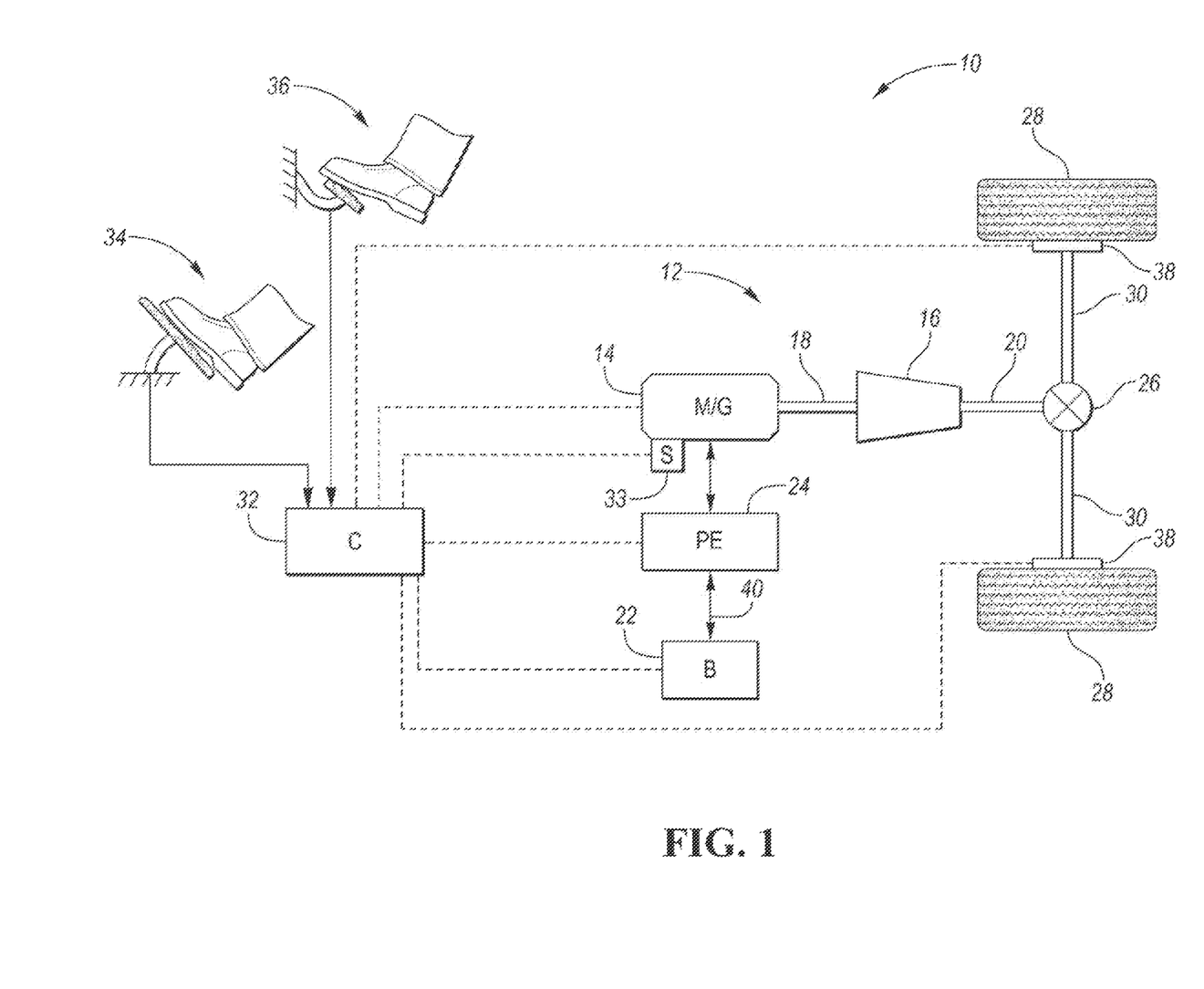
FIG. 1 is a schematic illustration of a representative powertrain of an electric vehicle.

Referring to FIG. 1, a schematic diagram of an electric vehicle 10 is illustrated according to an embodiment of the present disclosure. FIG. 1 illustrates representative relationships among the components. Physical placement and orientation of the components within the vehicle may vary. The electric vehicle 10 includes a powertrain 12. The powertrain 12 includes an electric machine such as an electric motor/generator (M/G) 14 to propel the vehicle 10. The M/G 14 drives a transmission (or gearbox) 16. More specifically, the M/G 14 may be rotatably connected to an input shaft 18 of the transmission 16. The transmission 16 may be placed in PRNDSL (park, reverse, neutral, drive, sport, low) via a transmission range selector (not shown). The transmission 16 may have a fixed gearing relationship that provides a single gear ratio between the input shaft 18 and an output shaft 20 of the transmission 16. A torque converter (not shown) or a launch clutch (not shown) may be disposed between the M/G 14 and the transmission 16. Alternatively, the transmission 16 may be a multiple step-ratio automatic transmission. An associated traction battery 22 is configured to deliver electrical power to or receive electrical power from the M/G 14.

The M/G 14 is a drive source for the electric vehicle 10 that is configured to propel the electric vehicle 10. The M/G 14 is configured to draw electrical power from the battery 22 to propel the vehicle 10 in response to a gas pedal 34 request, which may be processed by a controller. The M/G 14 is also configured to deliver electrical power to the battery 22 to recharge the battery 22, which may occur during regenerative braking or during periods where another power source, such as an engine, is powering the M/G 14. The M/G 14 may be implemented by any one of a plurality of types of electric machines. For example, M/G 14 may be a permanent magnet synchronous motor. Power electronics 24 condition direct current (DC) power provided by the battery 22 to the requirements of the M/G 14, as will be described below. For example, the power electronics 24 may provide three phase alternating current (AC) to the M/G 14.

If the transmission 16 is a multiple step-ratio automatic transmission, the transmission 16 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between the transmission output shaft 20 and the transmission input shaft 18. The transmission 16 is automatically shifted from one ratio to another based on various vehicle and ambient operating conditions by an associated controller, such as a powertrain control unit (PCU). Power and torque from the M/G 14 may be delivered to and received by transmission 16. The transmission 16 then provides powertrain output power and torque to output shaft 20.

It should be understood that the hydraulically controlled transmission 16, which may be coupled with a torque converter (not shown), is but one example of a gearbox or transmission arrangement; any multiple ratio gearbox that accepts input torque(s) from a power source (e.g., M/G 14) and then provides torque to an output shaft (e.g., output shaft 20) at the different ratios is acceptable for use with embodiments of the present disclosure. For example, the transmission 16 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 20 is connected to a differential 26. The differential 26 drives a pair of drive wheels 28 via respective axles 30 connected to the differential 26. The differential 26 transmits approximately equal torque to each wheel 28 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 32 such as a powertrain control unit (PCU). While illustrated as one controller, the controller 32 may be part of a larger control system and may be controlled by various other controllers throughout the vehicle 10, such as a vehicle system controller (VSC). It should therefore be understood that the powertrain control unit 32 and one or more other controllers can collectively be referred to as a "controller" that controls various actuators in response to signals from various sensors to control functions such as operating the M/G 14 to provide wheel torque or charge the battery 22, select or schedule transmission shifts, etc. Controller 32 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 32 communicates with various vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 32 may communicate signals to and/or receive signals from the M/G 14, battery 22, transmission 16, power electronics 24, and any another component of the powertrain 12 that may be included, but is not shown in FIG. 1 (i.e., a launch clutch that may be disposed between the M/G 14 and the transmission 16. Although not explicitly illustrated, those of ordinary skill in the art will recognize various functions or components that may be controlled by controller 32 within each of the subsystems identified above. Representative examples of parameters, systems, and/or components that may be directly or indirectly actuated using control logic and/or algorithms executed by the controller 32 include front-end accessory drive (FEAD) components such as an alternator, air conditioning compressor, battery charging or discharging, regenerative braking, M/G 14 operation, clutch pressures for the transmission gearbox 16 or any other clutch that is part of the powertrain 12, and the like. Sensors communicating input through the I/O interface may be used to indicate wheel speeds (WS1, WS2), vehicle speed (VSS), coolant temperature (ECT), gas pedal position (PPS), ignition switch position (IGN), ambient air temperature (e.g., ambient air temperature sensor), transmission gear, ratio, or mode, transmission oil temperature (TOT), transmission input and output speed, shift mode (MDE), battery temperature, voltage, current, or state of charge (SOC) for example.

Control logic or functions performed by controller 32 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle and/or powertrain controller, such as controller 32. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

A gas pedal 34 is used by the driver of the vehicle to provide a demanded torque, power, or drive command to the powertrain 12 (or more specifically M/G 14) to propel the vehicle. In general, depressing and releasing the gas pedal 34 generates an gas pedal position signal that may be interpreted by the controller 32 as a demand for increased power or decreased power, respectively. A brake pedal 36 is also used by the driver of the vehicle to provide a demanded braking torque to slow the vehicle. In general, depressing and releasing the brake pedal 36 generates a brake pedal position signal that may be interpreted by the controller 32 as a demand to decrease the vehicle speed. Based upon inputs from the gas pedal 34 and brake pedal 36, the controller 32 commands the torque and/or power to the M/G 14, and friction brakes 38. The controller 32 also controls the timing of gear shifts within the transmission 16.

The M/G 14 may act as a motor and provide a driving force for the powertrain 12. To drive the vehicle with the M/G 14 the traction battery 22 transmits stored electrical energy through wiring 40 to the power electronics 24 that may include an inverter, for example. The power electronics 24 convert DC voltage from the battery 22 into AC voltage to be used by the M/G 14. The controller 32 commands the power electronics 24 to convert voltage from the battery 22 to an AC voltage provided to the M/G 14 to provide positive or negative torque to the input shaft 18.

The M/G 14 may also act as a generator and convert kinetic energy from the powertrain 12 into electric energy to be stored in the battery 22. More specifically, the M/G 14 may act as a generator during times of regenerative braking in which torque and rotational (or kinetic) energy from the spinning wheels 28 is transferred back through the transmission 16 and is converted into electrical energy for storage in the battery 22.

A temperature sensor 33 (e.g., a thermistor) may be being utilized to determine the temperature of the M/G 14. The temperature sensor 33 may be in communication with the controller 32 and may be configured to relay the temperature of the M/G 14 to the controller 32. The controller 32 may be programmed to control a power output of the M/G 14 based on the temperature of the M/G 14. For example, the controller 32 may be programmed to adjust the torque, speed, and/or power output of the M/G 14 to a desired torque, speed, and/or power output, which may be based on positions of the gas pedal 34 and/or the brake pedal 36, when the temperature of the M/G 14 is within a desired range. On the other hand, the controller 32 may be programmed to adjust the torque, speed, and/or power output of the M/G 14 to less than the desired torque, speed, and/or power output when the temperature of the M/G 14 is less than or greater than the desired range. If the temperature exceeds an upper limit or is less than a lower limit, the controller 32 may be programmed to shutdown the M/G 14 altogether.

It should be understood that the schematic illustrated in FIG. 1 is merely representative and is not intended to be limiting. Other configurations are contemplated without deviating from the scope of the disclosure. It should be understood that the vehicle configuration described herein is merely exemplary and is not intended to be limited. Other electric or hybrid electric vehicle configurations should be construed as disclosed herein. Other electric or hybrid vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

In hybrid configurations that include an internal combustion engine such as a gasoline, diesel, or natural gas powered engine, or a fuel cell, the controller 32 may be configured to control various parameters of such an internal combustion engine. Representative examples of internal combustion parameters, systems, and/or components that may be directly or indirectly actuated using control logic and/or algorithms executed by the controller 32 include fuel injection timing, rate, and duration, throttle valve position, spark plug ignition timing (for spark-ignition engines), intake/exhaust valve timing and duration, etc. Sensors communicating input through the I/O interface from such an internal combustion engine to the controller 32 may be used to indicate turbocharger boost pressure, crankshaft position (PIP), engine rotational speed (RPM), intake manifold pressure (MAP), throttle valve position (TP), exhaust gas oxygen (EGO) or other exhaust gas component amount or presence, intake air flow (MAF), etc.

It should be understood that the vehicle configuration described herein is merely exemplary and is not intended to be limited. Other electric, or hybrid vehicle configurations should be construed as disclosed herein. Other vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

Figure 2:
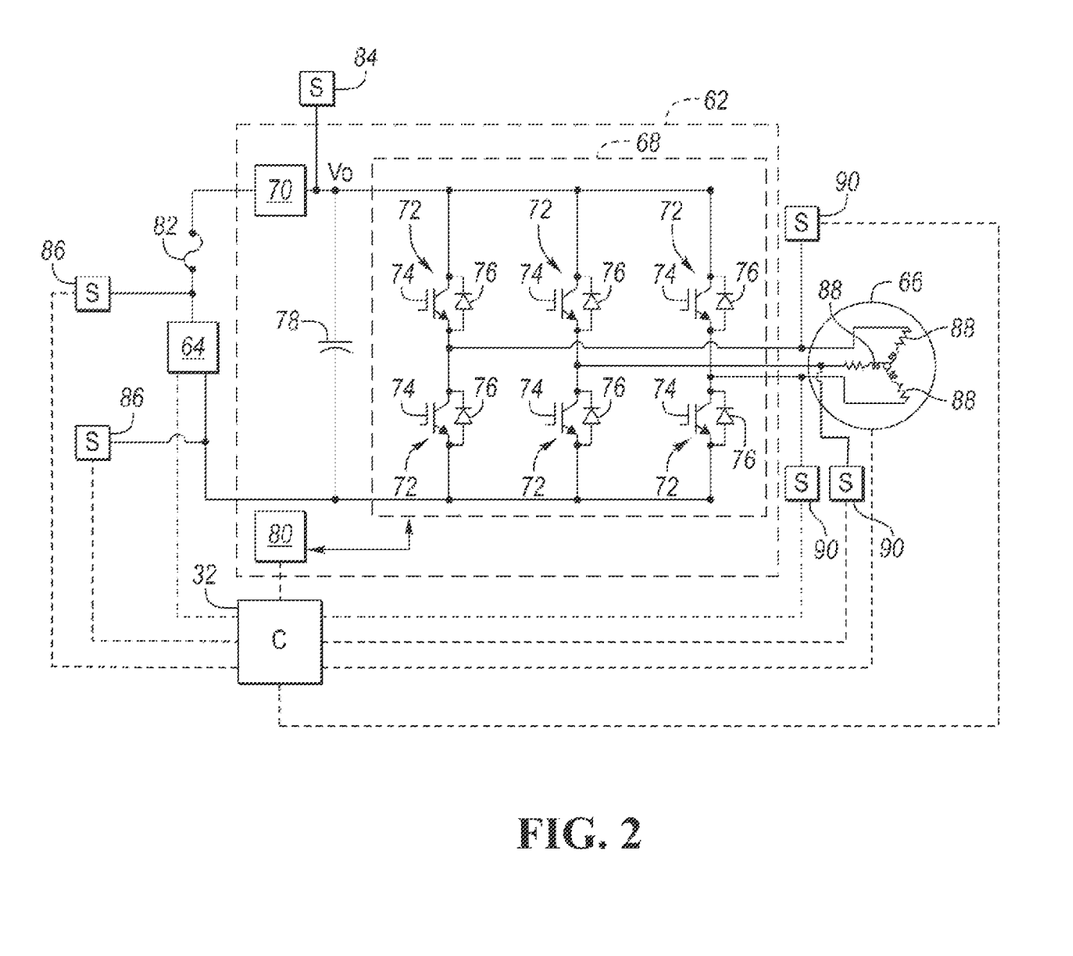
FIG. 2 is a circuit diagram of a power controller illustrating an inverter that is coupled to a DC power source and an electric machine.

Referring to FIG. 2, a circuit diagram of a power controller (or power supply device) 62 coupled to a power source 64 (e.g., battery 22) and an electric machine 66 (e.g., M/G 14) is illustrated. The power source 64 may be coupled to the power controller 62 in order to drive the electric machine 66. The power controller 62 may include an inverter 68 and a voltage converter 70. The voltage converter 70 may be DC to DC converter. Alternatively, the voltage converter 70 may be a separate component that is not integral to the power controller 62. The inverter 68 and the voltage converter 70 may be configured to deliver electrical power to the electric machine 66.

The inverter 68 includes inverting circuitry. The inverting circuitry may include switching units 72. The switching units 72 may each comprise a transistor 74, such as an insulated gate bipolar transistor (IGBT), in antiparallel with a diode 76. The switching units 72 may be configured to provide alternating current to the electric machine 66. More specifically, the inverter 68 may be configured to convert direct electrical current provided by the power source 64 into alternating electrical current, which is then delivered to the electric machine 66. The power controller 62 may include a linking capacitor 78. The linking capacitor 78 may be disposed between the power source 64 and the inverter 68. The linking capacitor 78 may be configured to absorb ripple currents generated at the inverter 68 or the power source 64, and stabilize the DC-link voltage, Vo, for inverter 68 control. Stated in other terms, the linking capacitor 78 may be arranged to limit voltage variation at an input of inverting circuitry due to ripple currents generated by the inverting circuitry or a battery, such as a traction battery, that may comprise the power source 64. The power controller 62 may include a drive board 80 for controlling the inverting circuitry. The drive board 80 may be a gate drive board that is configured to operate the transistors 74 of the switching units 72 of the inverter 68 when converting the direct current of the power source 64 into alternating current and delivering the alternating current to the electric machine 66.

The voltage converter 70 may include an inductor. The circuitry of the voltage converter (not shown), including the inductor, may be configured to amplify or increase the voltage of the electrical power being delivered to the electric machine 66 from the power source 64. A fuse 82 may be disposed on the direct current side of the inverter 68 to protect the inverting circuitry from surges in electrical power.

The disclosure should not be construed as limited to the circuit diagram of FIG. 2, but should be construed to include power control devices that include other types inverters, capacitors, converters, or combinations thereof. For example, the inverter 68 may be an inverter that includes any number of switching units and should not be construed as limited to the number of switching units depicted in FIG. 2. Alternatively, the linking capacitor 78 may be configured to couple one or a plurality of inverters to a power source.

The controller 32 may be in communication with the power source 64 (e.g., battery 22), the electric machine 66 (e.g., M/G 14), and the drive board 80. In response to a command to provide torque and power to propel the vehicle 10, the controller 32 may operate the power source 64, drive board 80, and electric machine 66 such that the desired power is delivered to the electric machine 66 from the power source 64 via the inverter 68 of the power controller 62. The power, electrical voltage, and/or electrical current may be monitored at various points within the system and communicated to and/or adjusted via the controller 32 to obtain the desired torque and/or power output the electric machine 66. The DC power, DC electrical voltage, and/or DC electrical current that is being delivered to the inverter 68 may be determined by sensor 84. The DC power, DC electrical voltage, and/or DC electrical current that is being generated by the power source 64 may be determined by one or more sensors 86. The AC power, AC electrical voltage, and/or AC electrical current that is being delivered to each winding phase 88 of the electric machine 66 may be determined by one or more sensors 90. More specifically, the winding phases 88 may represent several phases of windings on the stator of the electric machine 66 that are configured to generate magnetic fields that interact with magnets on the stator of the electric machine 66 to produce rotational motion. The controller 32 may include an algorithm that converts the various measurements to a torque or power being output of the electric machine 66.

Referring to FIG. 1, an electric machine 20 may be used in a vehicle such as a fully electric vehicle or a hybrid-electric vehicle. The electric machine 20 may be referred to as an electric motor, a traction motor, a generator, or the like. The electric machine 20 may be a permanent magnet machine, an induction machine, or the like. In the illustrated embodiment, the electric machine 20 is a three-phase alternating current (AC) machine. The electric machine 20 is capable of acting as both a motor to propel the vehicle and as a generator such as during regenerative braking.

The electric machine 20 may be powered by an electrical power source such as a traction battery of the vehicle. The traction battery may supply a high-voltage direct current (DC) output from one or more battery-cell arrays, sometimes referred to as battery-cell stacks, within the traction battery. The battery-cell arrays may include one or more battery cells that convert stored chemical energy to electrical energy. The cells may include a housing, a positive electrode (cathode), and a negative electrode (anode). An electrolyte allows ions to move between the anode and cathode during discharge, and then return during recharge. Terminals allow current to flow out of the cells for use by the vehicle.

The traction battery may be electrically connected to one or more power electronics modules. The power electronics modules may be electrically connected to the electric machines 20 and may provide the ability to bi-directionally transfer electrical energy between the traction battery and the electric machine 20. For example, a suitable traction battery may provide a DC voltage while the electric machine 20 may require a three-phase (AC) voltage. The power electronics module may include an inverter that converts the DC voltage to a three-phase AC voltage as required by the electric machine 20. In a regenerative mode, the power electronics module may convert the three-phase AC voltage from the electric machine 20 acting as a generator to the DC voltage required by the traction battery.

Figure 3:
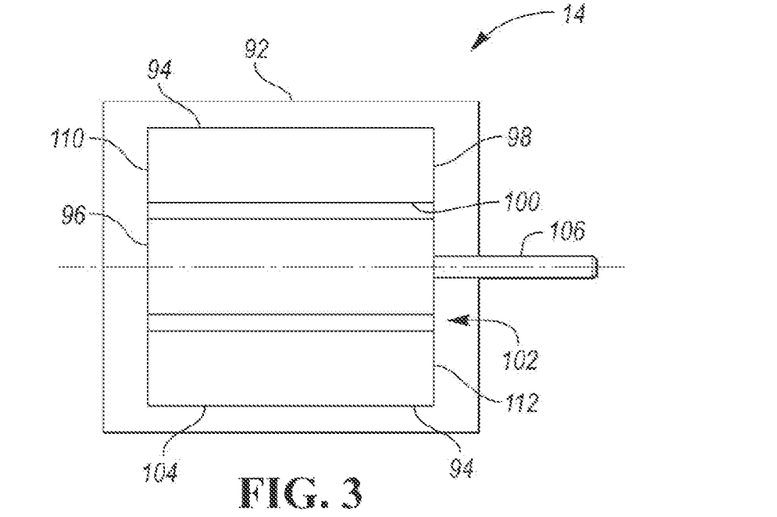
FIG. 3 is a schematic diagram of an electric machine.
Figure 4:
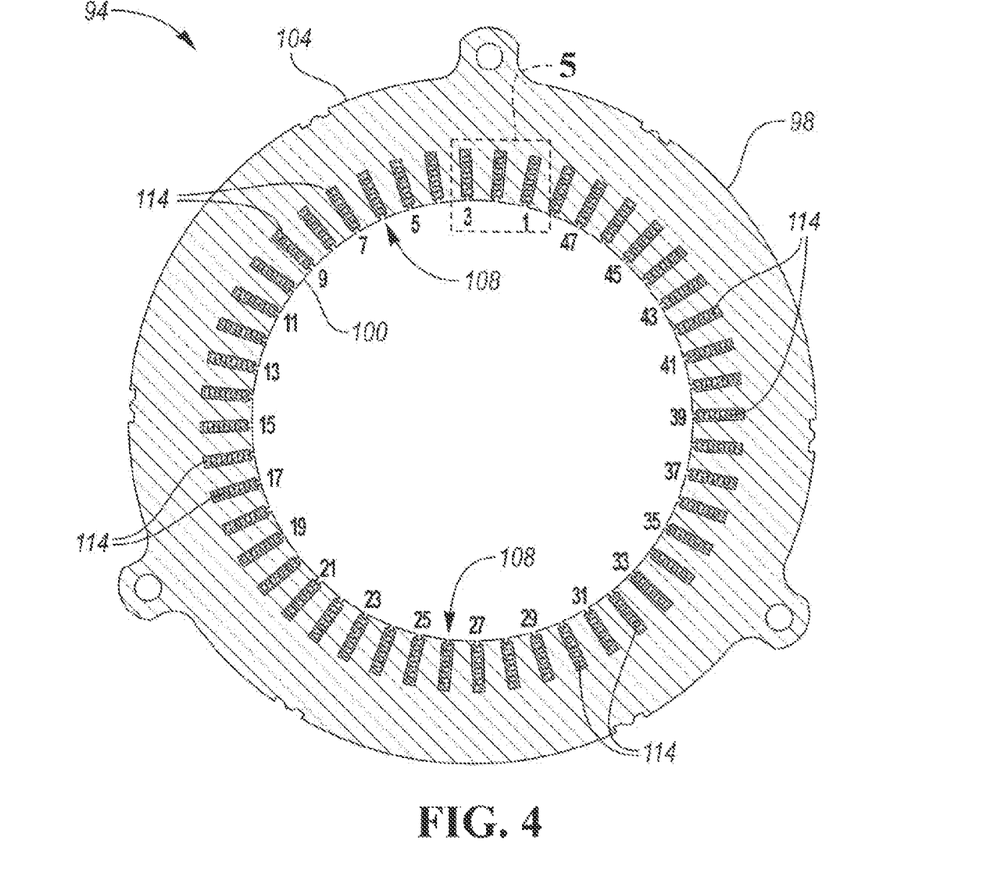
FIG. 4 is a cross-sectional end view of a stator of the electric machine.

Referring to FIGS. 3 and 4, the M/G 14 may include a housing 92 that encloses the stator 94 and the rotor 96. The stator 94 may be fixed to the housing 92 and includes a cylindrical stator core 98 having an inner diameter (ID) 100 that defines a hole 102 and an outer diameter (OD) 104. The stator core 98 may be formed from a plurality of stacked laminations. The rotor 96 is supported for rotation within the hole 102. The rotor 96 may include windings or permanent magnets that interact with magnetic field generated by the windings of the stator 94 to generate rotation of the rotor 96 when the M/G 14 is energized. The rotor 96 may be supported on a shaft 106 that extends through the housing 92. The shaft 106 is configured to couple with a drivetrain of the vehicle to output torque for vehicle propulsion or receive mechanical regenerative energy from vehicle motion.

The stator core 92 defines circumferentially-arranged slots 108 around the stator core 98 and extending outward from the inner diameter 100. The slots 108 are configured to receive the hairpins windings 114. The slots 108 may be equally spaced around the circumference, may be circumferentially arranged between the inner diameter 100 and the outer diameter 104 of the stator core 98 (e.g., the slots 108 may extend radially from the inner diameter 100 to the outer diameter 104 of the stator core 98), and may extend axially from a first end 110 of the stator core 98 to a second end 112. Each slot 108 has a plurality of pin positions that is arranged in a direction that extends from the inner diameter 100 toward the outer diameter 104 of the stator core 98. In the illustrated embodiment, the stator core 98 defines forty-eight slots and has eight poles, but the stator core 98 may include more or fewer slots and/or poles in other embodiments. For example, the stator core 98 may define seventy-two slots and have eight poles.

The slots 108 are spaced by a circumferential distance measured between the center lines of two adjacent slots. This distance can be used as a unit of distance (hereinafter "a slot") for relating to, and measuring, other components of the stator 94. The distance unit "slot" is also sometimes referred to as "slot pitch" or "slot span." The slots 108 are also referenced by numbers 1 through 48 in the counter-clockwise direction with the odd number slots being labeled for convenience. The slots may be characterized as odd slots (i.e., slots 1, 3, 5, etc.) and even slots (i.e., slots 2, 4, 6, etc.). The odd and even designation is for ease of description in explaining the arrangement of the windings, and the structure of odd and even slots may be the same.

Figure 5:
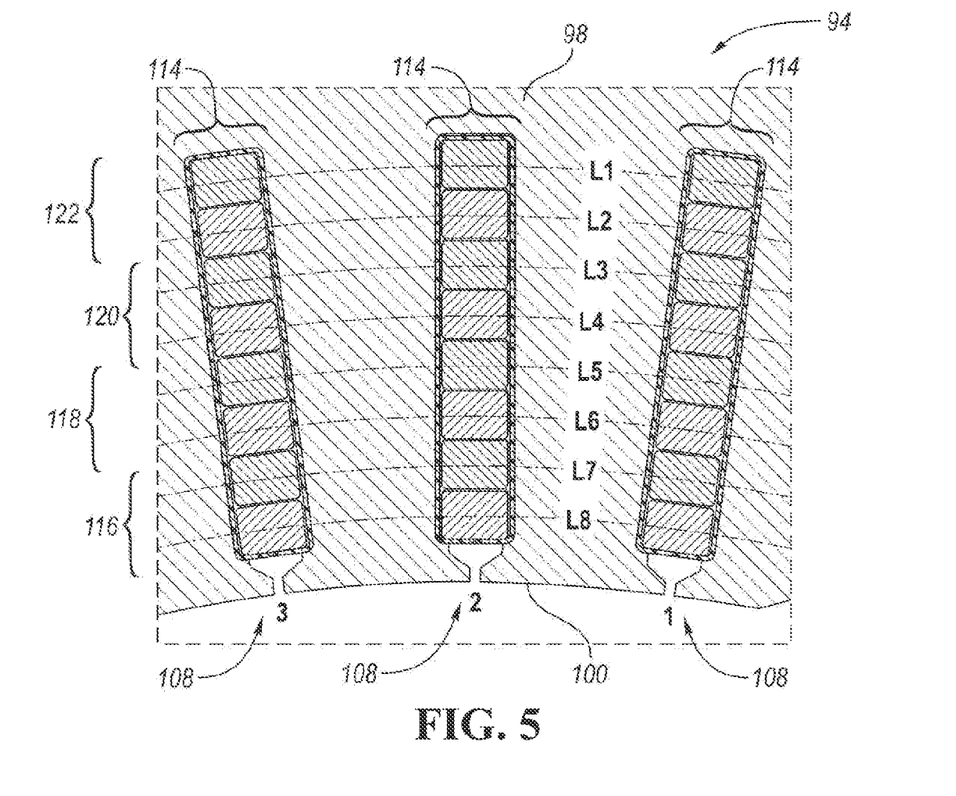
FIG. 5 is a magnified view of a portion of FIG. 2.

Referring to FIG. 5, the M/G 14 includes hairpin windings 114 routed through the slots 108 of the stator core 98. Hairpin winding configurations can increase efficiency for electric machines used in vehicles as well as other applications. The hairpin windings 114 increase efficiency by providing a greater amount of stator conductors to reduce resistance of the winding without encroaching into space reserved for the electrical steel and the magnetic flux path. The hairpin windings may be arranged as wave windings in which the windings 114 weave from pole to pole in a wave-like pattern. It should be noted that the windings 114 are shown as cross-sections in FIG. 5 for illustrative purposes.

The M/G 14 of the present disclosure may be a three-phase current electric machine in which the hairpin windings are arranged in three electrical phases. The phases may be referred to first, second, and third phases in any order. In the examples of the present disclosure, each phase includes a plurality of individual hairpin conductors arranged in parallel winding paths. For example, each phase may include a plurality of individual hairpin conductors arranged in four parallel winding paths. This disclosure, however, should not be construed as limited to an electric machine having three electrical phases but should be construed to include an electric machine having at least one electrical phase or a plurality of electrical phases, and should be construed to include electrical phases having at least one winding path or a plurality of parallel winding paths.

The slots 108 may include an inner radial layer 116 of hairpins, an inner middle radial layer 118 of hairpins, an outer middle radial layer 120 of hairpins, and an outer radial layer 122 of hairpins. Each of the layers may include at least two radial pin positions that are adjacent to each other. In the illustrated embodiment, each slot 108 has eight sequential pin positions (i.e., L1 through L8) in a one-by-eight linear arrangement, however, other arrangements are contemplated. The first position L1, is nearest the OD 104 of the stator core 98 and the eighth position L8 is nearest the ID 100 of the stator core 98. The innermost radial layer 116 includes both the seventh position L7 and the eighth position L8. The inner middle radial layer 118 includes both the fifth position L5 and the sixth position L6. The outer middle radial layer 120 includes both the third position L3 and the fourth position L4. The outermost radial layer 122 includes both the first position L1 and the second position L2.

Figure 6:
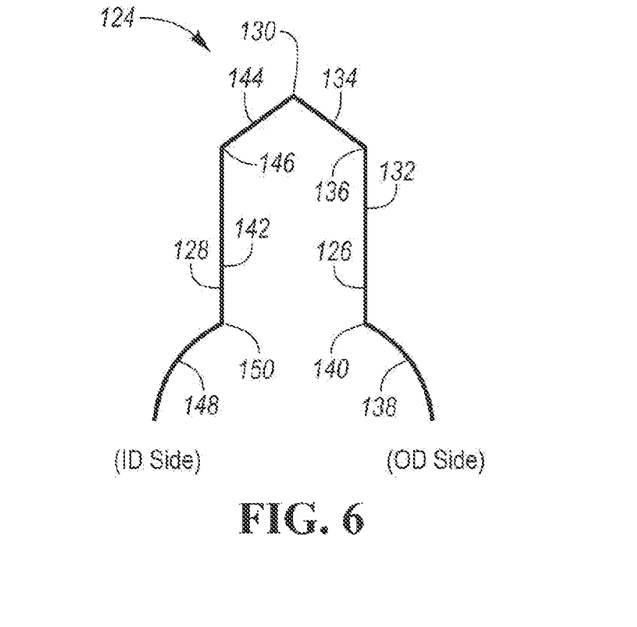
FIG. 6 is a front view of a hairpin.

Referring to FIG. 6, one of a plurality of the hairpins 124 that form the windings 114 are schematically depicted to show the general configuration. The hairpins are generally U-shaped and include a pair of legs joined by a crown. Each of a plurality of hairpins are installed in the stator core 98 by routing each leg portion through a corresponding one of the slots 108. Each hairpin may be installed from the same end of the stator core 98 (e.g., from end 110) so that once installed all of the crowns are located on one end of the stator, and the ends of the legs all are located on the opposing end (e.g., end 112). Generally, end 110 may be referred to as the crown end and end 112 may be referred to as the weld end. Once installed, the legs of the hairpins are bent away from each other to form twists that connect with the twists of other hairpins. The ends of corresponding hairpins are joined by an electrically conductive connection such as a weld. The connections may be arranged in rows. The windings 114 may be jumper-less (i.e., each hairpin is interconnected to another hairpin directly) or may include a minimum number of jumpers. A jumper is a conductor that is typically disposed at one of the ends of the stator core, i.e., does not extend through a slot, and interconnects hairpins that are spaced far enough apart that they cannot be directly connected to each other.

Each arrangement may include hairpins as described in FIG. 6. Hairpin 124 may be formed from a single piece of metal such as copper, aluminum, silver, or any other electrically conductive material. The hairpin 124 may include a first leg 126 joined to a second leg 128 at a vertex 130. The first leg 126 is disposed within in one of the slots 108 and the second leg 128 is disposed in another of the slots 108 that is spaced apart by a span of slots. The first leg 126 includes a straight portion 132 disposed within a slot 108 and a first angled portion 134 that extends between the vertex 130 and the straight portion 132. The straight portion 132 and the angled portion 134 are joined at a first bend 136. The first leg 126 also includes a twist portion 138 that is angled outward at a second bend 140. The second leg 128 includes a straight portion 142 disposed within a slot 108 and a second angled portion 144 that extends between the vertex 130 and the straight portion 142. The first and second angled portions 134, 144 and the vertex 130 by be collectively referred to as a crown. The straight portion 142 and the angled portion 144 are joined at a first bend 146. The second leg 128 also includes a twist portion 148 that is angled outward at a second bend 150. The twists 138, 148 are angled in opposing directions to extend away from the hairpin 124 to connect with adjacent pins of the winding path. The twists 138, 148 may have a pitch span that is equal to the pin span between adjacent hairpins divided by two.

The hairpin 124 may be fabricated by first forming the vertex 130, the first angled portions 134, 144, and the two extended straight portions. Then, the hairpin 124 is installed into the stator 94 by inserting the extended straight portions into the slots 108 of the stator 94. The second bends 140, 150 and the twists 138, 148 may be formed after the hairpin 124 is installed through the slots by bending the extended legs as desired. The first and last regular pins of a winding path may have a longer or shorter twist to facilitate connection with the terminal leads or neutral connections.

Figure 7:
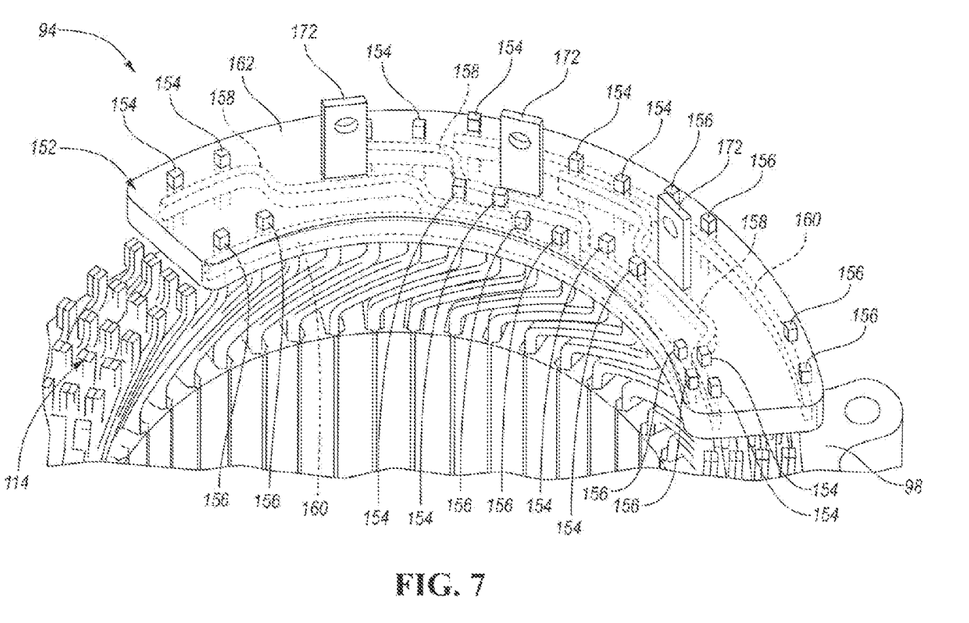
FIG. 7 is top isometric view of a terminal block secured to the stator of the electric machine.
Figure 8:
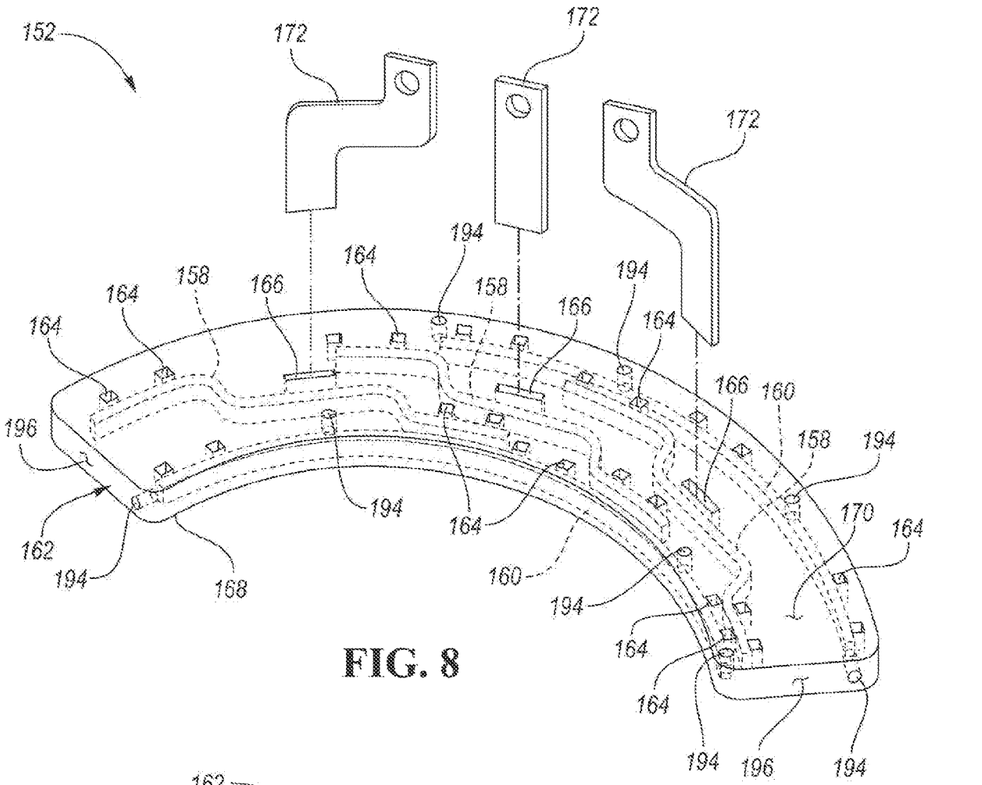
FIG. 8 is a top isometric exploded view of the terminal block for the electric machine.
Figure 9:
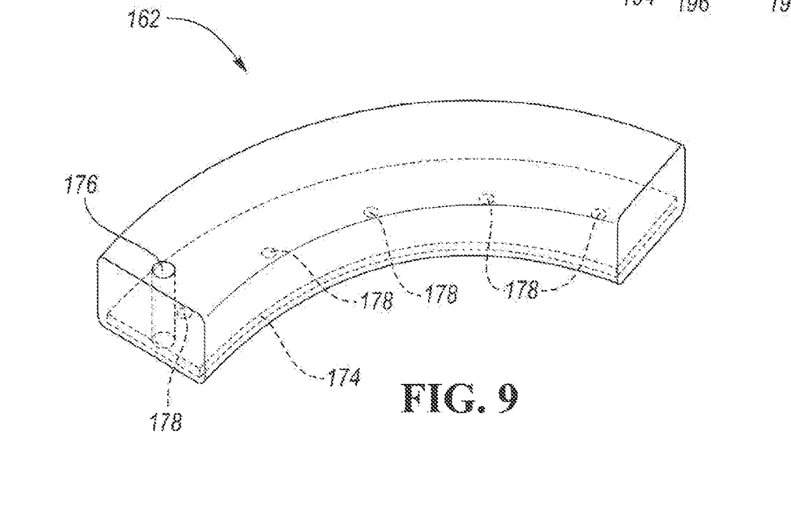
FIG. 9 is a top isometric view of the terminal block illustrating cooling channels.

Referring to FIGS. 7-9, a terminal block 152 that is secured to an end of the stator 94 of the M/G 14 is illustrated. More specifically, the terminal block 152 is secured to the windings 114 along an axial end of the windings 114. The axial end of the windings 114 may be referred to as the end windings. The windings 114 include lead ends 154 and neutral ends 156. More specifically, the lead ends 154 may be lead hairpins that are each the first hairpin in a link of hairpins forming one of the electrical winding paths and the neutral ends 156 may be the hairpins that are each the last hairpin in a link of hairpins forming one of the electrical winding paths.

The terminal block 152 includes a bus bar 158 for each electrical phase and one or more neutral bars 160. The lead ends 154 of each electrical winding path are connected to one of the bus bars 158 and the neutral ends 156 of each electrical winding path are connected to a neutral bar 160. The electrical winding paths having lead ends 154 connected to the same bus bar are parallel electrical winding paths that are part of a single electrical phase of the M/G 14. Therefore, as illustrated in FIG. 7, the M/G 14 has three electrical phases, and each electrical phase has four parallel electrical winding paths. The M/G 14, however, should not be construed as limited to an electric machine having a specific number of electrical phases or a specific number of electrical winding paths, but should be construed to include an electric machine having any number of electrical phases where each electrical phase has one or more winding paths.

The terminal block 152 includes an insulating material 162 encapsulating the bus bars 158 and the one or more neutral bars 160. The insulating material 162 defines a plurality of orifices or ports 164 and a plurality of slots or terminal receiving orifices 166. Each port 164 extends from an outer boundary of the insulating material 162 to one of the bus bars 158 or to a neutral bar 160. More specifically, each port 164 may extend from a first or bottom outer surface 168 of the insulating material 152 to one of the bus bars 158 or to a neutral bar 160. Each terminal receiving orifice 166 extends from the outer boundary of the insulating material 162 to one of the bus bars 158. More specifically, each terminal receiving orifice 166 extends from a second or top outer surface 170 of the insulating material 162 to one of the bus bars 158. The first or bottom outer surface 168 and the second or top outer surface 170 may be opposing surfaces that are on opposing or opposite sides of the insulating material 162. The first or bottom outer surface 168 and the second or top outer surface 170 may also face away from the insulating material 162 in opposite directions. Each lead end 154 and neutral end 156 extends through one of the ports 164 from the first or bottom outer surface 168 to a corresponding bus bar 158 or a corresponding neutral bar 160 to connect each electrical path to the corresponding bus bar 158 and corresponding neutral bar 160.

The terminal block 152 also includes terminal connectors 172. Each terminal connector 172 extends through one of the terminal receiving orifices 166 and is connected to one of the bus bars 158. The terminal connectors 172 protrude outward from the second or top outer surface 170 of the insulating material 162. Each terminal connector 172 is configured to connect an input power source to one of the electrical phases. For example, each terminal connector 172 is connected to and receives power from one of the power phases being output from the power electronics 24, or more specifically being output from the inverter. Each terminal connector 172 then delivers the power to one of the bus bars 158 and one of the electrical phases of the windings 114.

The terminal block design may be commonly utilized in electric machines having identical winding configurations but allows for differently routed terminal connectors so that the terminal block may be used across multiple vehicle programs that require different routing for the terminal connectors. For example, the terminal connectors 172 in FIGS. 7 and 8 have slightly different shapes and routing configurations. The bus bars 158, neutral bars 160, portions of the lead ends 154, portions of the neutral ends 156, and portions of the terminal connectors 172 may be overmolded by insulating material 162. Alternatively, the bus bars 158 and neutral bars 160 may be overmolded by the insulating material 162 while the portions of the lead ends 154, neutral ends 156, or terminal connectors 172 are inserted into the ports 164 or terminal receiving orifices 166 after the bus bars 158 and neutral bars 160 have been overmolded by the insulating material 162.

The insulating material 162 may be comprised of an electrically insulating material such as a thermoplastic, thermoset plastics, or polymer. The insulating material 162 may also define channels or chambers that are configured to route a cooling liquid to the end windings. For example, the insulating material 162 may define a chamber or channel 174 that receives cooling fluid from one or more inlets 176 and routes the cooling fluid to one or more outlets 178 that direct the cooling fluid onto the end windings. The overall area of the one or more outlets 178 may be smaller than the overall area of the one or more inlets 176 to produce a nozzle effect and increase the speed of the cooling fluid being sprayed onto the end windings. The first or bottom outer surface 168 of the insulating material 162 may also function as a baffle to redirect cooling fluid downward and onto the end windings.

Figure 10:
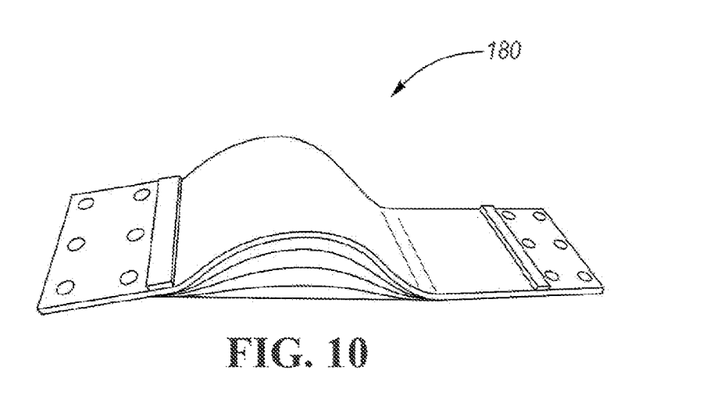
FIG. 10 illustrates a flexible joint of a bus bar.

Referring to FIG. 10, the bus bars 158 may include flexible joints 180 that are configured to engage a corresponding terminal connector 172. The flexible joints 180 may be comprised of thin metallic sheets (e.g., copper sheets) which are stacked together. The stacks of metallic sheets increase the cross-sectional area of the bus bars 158 at the position where the terminal connector 172 engages the bus bars 158, while also allowing the bus bars 158 to be flexible to facilitate engagement with the terminal connectors 172. The flexible joints 180 also have a decreased "skin effect" resistance, and thus lower electrical efficiency losses at high electrical frequencies.

Figure 11:
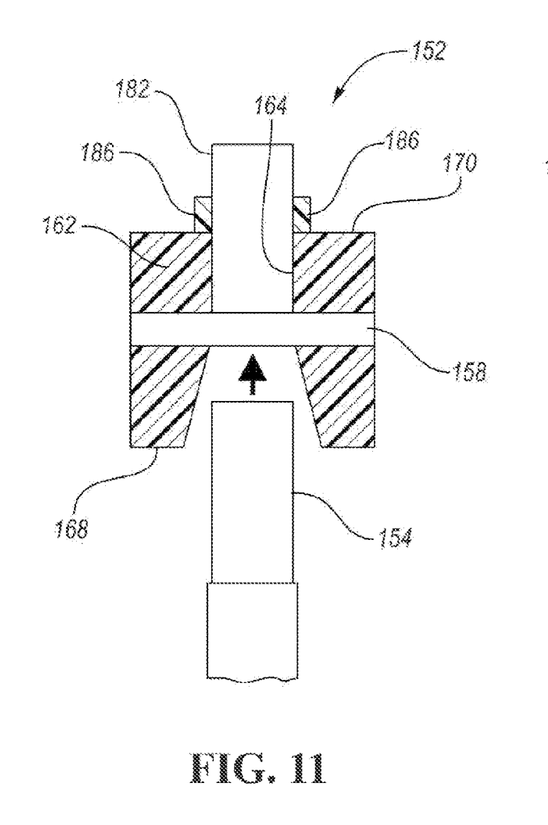
FIGS. 11 and 12 illustrate installation of a lead or neutral end connection onto the terminal block.
Figure 12:
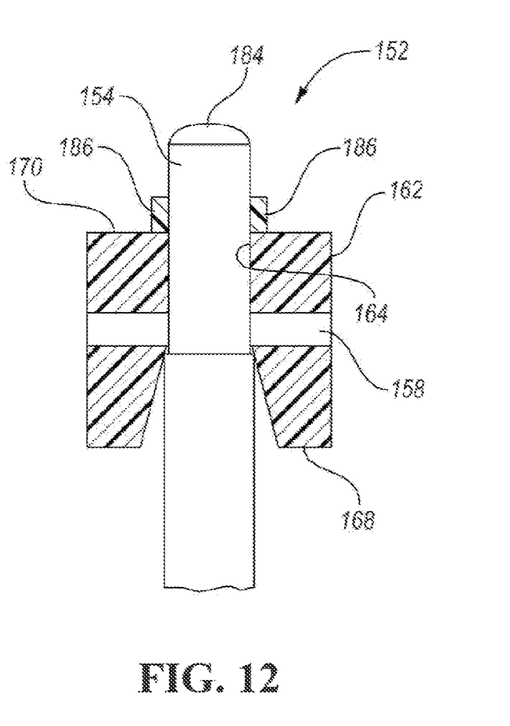

Referring to FIGS. 11 and 12, the installation of a lead or neutral end connection onto the terminal block 152 is illustrated. More specifically, FIGS. 11 and 12 illustrate the installation of a lead end 154 onto the terminal block 152 to establish an electrical connection between the lead end 154 and one of the bus bars 158. However, FIGS. 11 and 12 should also be construed to illustrate the installation of a neutral end 156 onto the terminal block 152 to establish an electrical connection between the neutral end 156 and one of the neutral bars 160. Exchanging call out numbers 154 and 158 for 156 and 160, respectively, in FIGS. 11 and 12 will correspond to an illustration of the installation of a neutral end 156 onto the terminal block 152 to establish an electrical connection between the neutral end 156 and one of the neutral bars 160. Furthermore, FIGS. 11 and 12 may be representative of all the lead ends 154 and neutral ends 156 that are installed onto the terminal block 152.

The lead ends 154 and the neutral ends 156 are installed onto the terminal block 152 by pushing each of the lead ends 154 and the neutral ends 156 into one of the ports 164 so that the lead ends 154 and the neutral ends 156 make contact with corresponding bus bars 158 and neutral bars 160, respectively, to establish the electrical connections between the lead ends 154 and corresponding bus bars 158 and to establish the electrical connections between the neutral ends 156 and corresponding neutral bars 160. A side view of an uninstalled position of the lead ends 154 and the neutral ends 156 is illustrated in FIG. 11 while a side view of an installed position of the lead ends 154 and the neutral ends 156 is illustrated in FIG. 12. The port 164 in FIGS. 11 and 12 may be illustrative of each port 164 defined by the terminal block 152. The ports 164 may taper inward from the first or bottom outer surface 168 of the insulating material 162 to facilitate insertion of the lead ends 154 and the neutral ends 156 into the ports 164.

The ports 164 may further extend from the corresponding bus bar 158 or neutral bar 160 to the second or top outer surface 170 of the insulating material 162. The bus bars 158 and neutral bars 160 may have extension plates 182 that each extend through one of the ports 164 and outward from the second or top outer surface 170 of the insulating material 162. The lead ends 154 and the neutral ends 156 may further extend from corresponding bus bars 158 and neutral bars 160, respectively, outward from the second or top outer surface 170 of the insulating material 162, and adjacent to a corresponding extension plate 182. Each lead end 154 and each neutral end 156 may be welded to an adjacent corresponding extension plate 182 at a position that is outward from the second or top outer surface 170 of the insulating material 162, which is illustrated by weld bead 184 in FIG. 12.

Guide blocks 186 may be disposed along the second or top outer surface 170 of the insulating material 162 and about each port 164. The guide blocks 186 are configured to facilitate alignment between each lead end 154 or each neutral end 156 and the adjacent corresponding extension plate 182 during and after installation of each lead end 154 and each neutral end 156 onto the terminal block 152.

Figure 13:
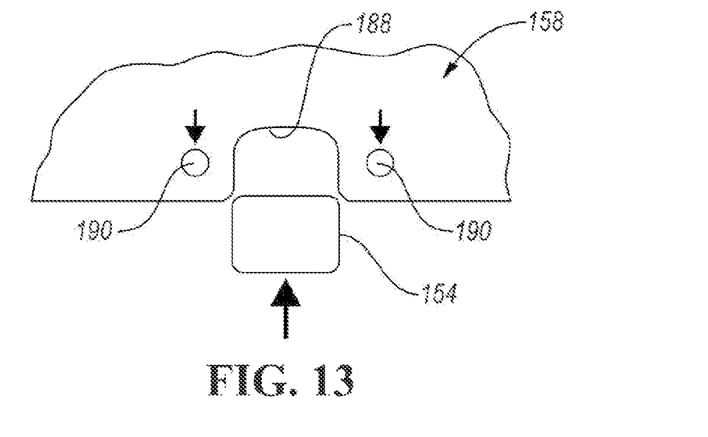
FIGS. 13-15 illustrate an alternative mode of installation of a lead or neutral end connection onto the terminal block.
Figure 14:
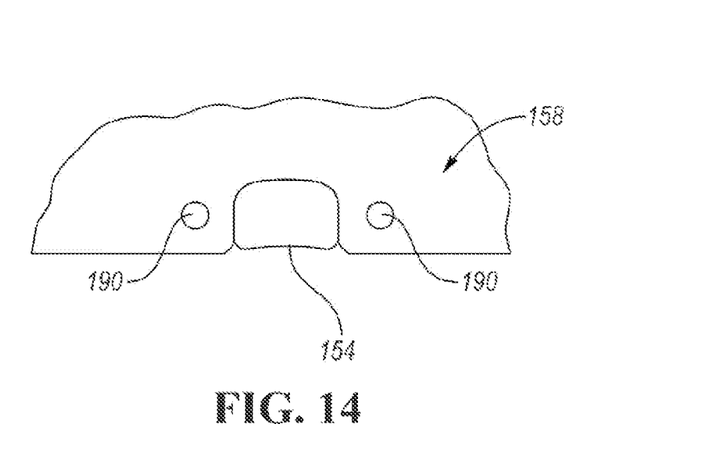
Figure 15:
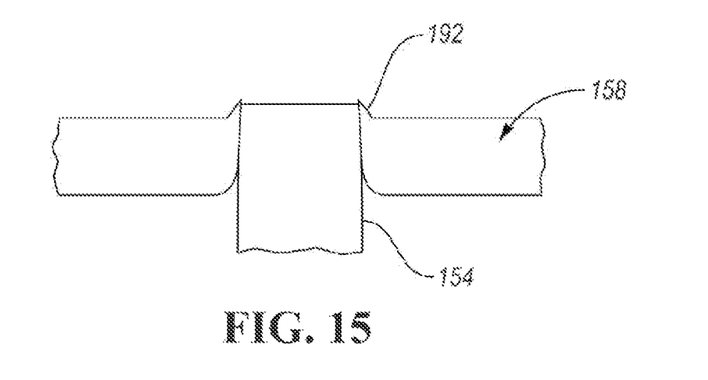

Referring to FIGS. 13-15, an alternative mode of installation of a lead or neutral end connection onto the terminal block 152 is illustrated. More specifically, FIGS. 13-15 illustrate the installation of a lead end 154 onto one of the bus bars 158. However, FIGS. 13-15 should also be construed to illustrate the installation of a neutral end 156 onto one of the neutral bars 160. Exchanging call out numbers 154 and 158 for 156 and 160, respectively, in FIGS. 13-15 will correspond to an illustration of the installation of a neutral end 156 onto one of the neutral bars 160. Furthermore, FIGS. 13-15 may be representative of each lead end 154 and each neutral end 156 that are installed onto the terminal block 152.

The lead ends 154 and the neutral ends 156 are installed by press-fitting the lead ends 154 and the neutral ends 156 into notches 188 defined by the bus bars 158 and neutral bars 160. A top view of an uninstalled position of the lead ends 154 and the neutral ends 156 is illustrated in FIG. 13 while a top view of an installed position of the lead ends 154 and the neutral ends 156 is illustrated in FIG. 14. FIG. 15 illustrates a side view of the installed position of the lead ends 154 and the neutral ends 156. The bus bars 158 and neutral bars 160 may define orifices 190. A pressing tool that is utilized to press the lead ends 154 and the neutral ends 156 into the notches 188 may engage the orifices 190 to anchor the pressing tool to the bus bars 158 and neutral bars 160 during installation of the lead ends 154 and the neutral ends 156 into the notches 188 and to prevent relative movement between the pressing tool and the bus bars 158 and neutral bars 160 during installation of lead ends 154 and the neutral ends 156 into the notches 188.

Once the lead ends 154 and the neutral ends 156 have been press-fit into the notches 188, the lead ends 154 and the neutral ends 156 may be welded to the corresponding bus bars 158 and neutral bars 160. The bus bars 158 and neutral bars 160 may form a burr edge 192 once the lead ends 154 and the neutral ends 156 have been press-fit into the notches 188. The burr edge 192 may be a deformation that occurs during installation of the lead ends 154 and the neutral ends 156. The burr edge 192 may function to maintain an inward force on the lead ends 154 and the neutral ends 156, which facilitates to maintain the positions of the lead ends 154 and the neutral ends 156 relative to the corresponding bus bars 158 and neutral bars 160.

Referring to FIGS. 8 and 16-18, three embodiments of a thermistor (e.g., temperature sensor 33) that is configured to measure a temperature of the M/G 14 are illustrated. More specifically, the thermistor is configured to measure a temperature of the M/G 14 at one of the neutral bars 160. The insulating material 162 may define several orifices 194 that are configured to receive the thermistor and position the thermistor so that the thermistor is in contact with one of the neutral bars 160. More specifically, the orifices 194 may extend from the second or top outer surface 170 of the insulating material 162 to the neutral bars 160 or may extend from side surfaces 196 of the insulating material 162 to the neutral bars 160.

Figure 16:
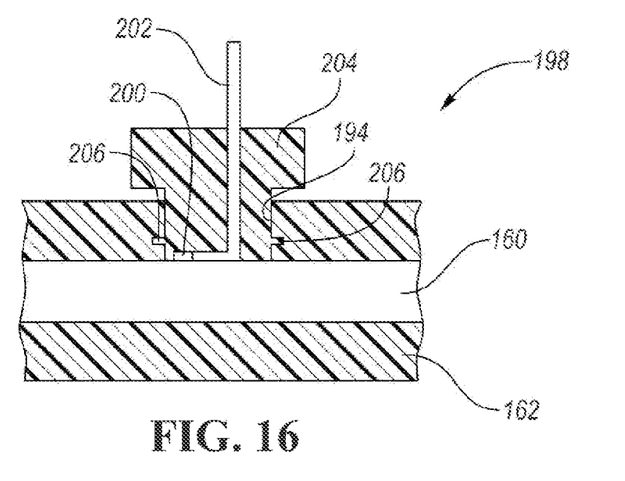
FIG. 16-18 illustrate three embodiments of a thermistor that is configured to measure a temperature of the electric machine.
Figure 17:
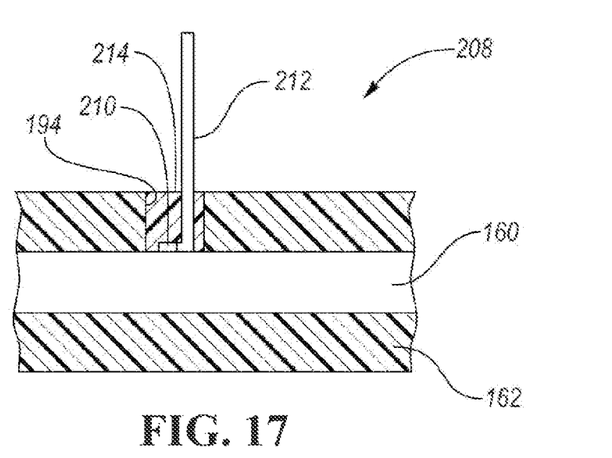
Figure 18:
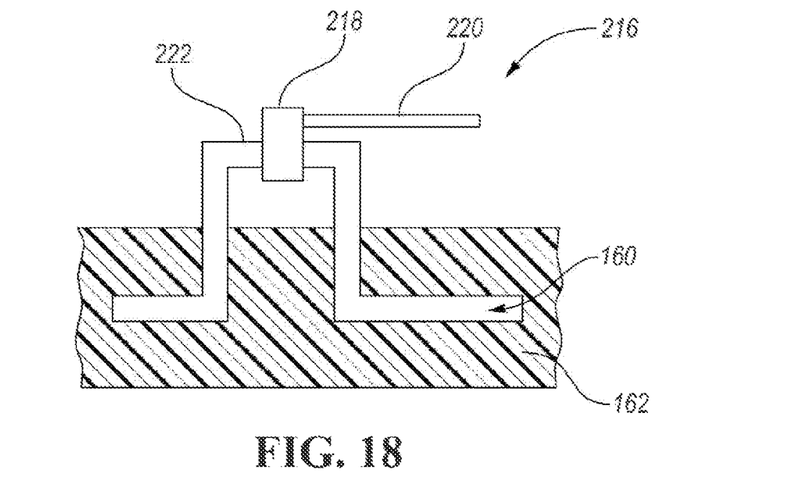

Alternatively, the orifices 194 may extend from the first or bottom outer surface 168 of the insulating material 162 to the neutral bars 160. The several orifices 194 provide several different positions for mounting the thermistor to the terminal block 152, which allows the common terminal block 152 to be utilized in several different designs that require different positions of the thermistor. Alternatively, the neutral bars 160 may protrude outward from one the external surfaces (e.g., first or bottom outer surface 168, second or top outer surface 170, or side surfaces 196) of the insulating material 162 and the thermistor may be secured to the neutral bar 160 at position that is external to the insulating material 162.

Referring to FIG. 16, a first embodiment of the thermistor 198 is illustrated. The first embodiment of the thermistor 198 includes a thermistor element 200 that is in contact with the neutral bar 160 and measures the temperature of the neutral bar 160. A wire 202 extends from the thermistor element 200 to the controller 32 to relay the temperature reading of the thermistor element 200 to the controller 32. The wire 202 extends through an orifice defined by a thermistor housing 204. The thermistor housing 204 operates to position of the thermistor element 200 against the neutral bar 160. More specifically, the thermistor housing 204 may include snap features 206 that engage notches defined in the insulating material 162 to secure the positions of the thermistor element 200, wire 202, and thermistor housing 204 relative to the insulating material 162. The thermistor element 200, a portion of the wire 202, and the housing 204 may more specifically be disposed within one of the orifices 194.

Referring to FIG. 17, a second embodiment of the thermistor 208 is illustrated. The second embodiment of the thermistor 208 includes a thermistor element 210 that is in contact with the neutral bar 160 and measures the temperature of the neutral bar 160. A wire 212 extends from the thermistor element 210 to the controller 32 to relay the temperature reading of the thermistor element 210 to the controller 32. A thermally conductive filler material 214 is disposed over the thermistor element 210 and a portion of the wire 212 to secure the positions of the thermistor element 210 and wire 212 relative to the insulating material 162. The thermistor element 210, a portion of the wire 212, and the thermally conductive filler material 214 may more specifically be disposed within one of the orifices 194.

Referring to FIG. 18, a third embodiment of the thermistor 216 is illustrated. The third embodiment of the thermistor 216 includes a thermistor element 218 that is in contact with the neutral bar 160 and measures the temperature of the neutral bar 160. A wire 220 extends from the thermistor element 218 to the controller 32 to relay the temperature reading of the thermistor element 218 to the controller 32.

The neutral bar 160 includes a portion 222 that is external to the insulating material 162. The thermistor element 218 is secured to and configured to measure the temperature of the neutral bar 160 along the portion 222 that is external to the insulating material 162.

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. An electric machine comprising:
   hairpin windings having a plurality of electrical phases, each electrical phase having a plurality of parallel electrical paths;
   a terminal block having,
      a plurality of bus bars, each bus bar connected to each parallel electrical path of the one of the electrical phases,
      at least one neutral bar connected to each electrical phase, and
      an insulating material (i) encapsulating the plurality of bus bars and the at least one neutral bar, (ii) defining a plurality of ports, and (iii) defining a plurality of terminal receiving orifices, wherein (i) each bus bar of the plurality of bus bars is spaced apart from and not connected to other bus bars of the plurality of bus bars within the insulating material, (ii) each bus bar of the plurality of bus bars is spaced apart from and not connected to the at least one neutral bar within the insulating material, (iii) each neutral bar of at least one neutral bar is spaced apart from and not connected to other neutral bars of the at least one neutral bar within the insulating material, (iv) each port extends from a first outer surface of the insulating material to one of the bus bars or to the at least one the neutral bar, (v) each terminal receiving orifice extends from a second outer surface of the insulating material to one of the bus bars, (vi) lead and end hairpins of the hairpin windings, each extending through one of the ports from the first outer surface to a corresponding bus bar or a corresponding neutral bar to connect each electrical path to the corresponding bus bar and the corresponding neutral bar; and
   terminal connectors, each (i) extending through one of the terminal receiving orifices, (ii) connected to one of the bus bars, and (iii) protruding outward from the second outer surface of the insulating material.

2. The electrical machine of claim 1, wherein the bus bars include flexible joints that engage corresponding terminal connectors.

3. The electrical machine of claim 1, wherein the ports taper inward from the first outer surface of the insulating material to facilitate insertion of the lead and end hairpins into the ports.

4. The electrical machine of claim 1, wherein each port further extends from the corresponding bus bar or the corresponding neutral bar to the second outer surface of the insulating material, and wherein the bus bars and neutral bars have extension plates that each extend through one of the ports and outward from the second outer surface of the insulating material.

5. The electrical machine of claim 4, wherein the lead and end hairpins further extend (i) from the corresponding bus bars or neutral bars, (ii) outward from the second outer surface of the insulating material, and (iii) adjacent to corresponding extension plates.

6. The electrical machine of claim 5 further comprising guide blocks disposed along the second outer surface of the insulating material and about each port, wherein the guide blocks are configured to facilitate alignment between each lead or end hairpin and adjacent corresponding extension plate.

7. The electrical machine of claim 1 further comprising a thermistor in connection with and configured to sense a temperature of the at least one neutral bar.

8. An electric machine comprising:
   windings having lead ends and neutral ends;
   a terminal block having,
      a plurality of bus bars, each connected to one or more of the lead ends,
      a neutral bar connected to one or more of the neutral ends, and
      an insulating material (i) encapsulating the plurality of bus bars and the neutral bar, (ii) defining a plurality of orifices, and (iii) defining a plurality of slots, wherein (i) each bus bar of the plurality of bus bars is spaced apart from and not connected to other bus bars of the plurality of bus bars within the insulating material, (ii) each bus bar of the plurality of bus bars is spaced apart from and not connected to the neutral bar within the insulating material, (iii) each orifice extends from an outer boundary of the insulating material to one of the bus bars or the neutral bar, (iv) each slot extends from the outer boundary to one of the bus bars on an opposing side of the insulating material relative to the orifices, (v) each lead end extends through one of the orifices from the outer boundary to one of the bus bars, and (iv) each neutral end extends through one of the orifices from the outer boundary to neutral bar; and
   terminal connectors, each (i) extending through one of the slots to one of the bus bars and (ii) protruding outward from the outer boundary on the opposing side of the insulating material.

9. The electrical machine of claim 8, wherein the bus bars include flexible joints that engage corresponding terminal connectors.

10. The electrical machine of claim 8, wherein the orifices taper inward from the outer boundary of the insulating material to facilitate insertion of the lead ends and the neutral ends into the orifices.

11. The electrical machine of claim 8, wherein each orifice further extends from one of the bus bars or the neutral bar to the opposing side of the insulating material, and wherein the bus bars and neutral bars have extension plates that each extend through one of the orifices and outward from the opposing side of the insulating material.

12. The electrical machine of claim 11, wherein the lead ends and neutral ends further extend (i) from the bus bars and neutral bar, respectively, (ii) outward from the opposing side of the insulating material, and (iii) adjacent to corresponding extension plates.

13. The electrical machine of claim 12 further comprising guide blocks disposed along the opposing side of the insulating material and about each orifice, wherein the guide blocks are configured to facilitate alignment between each lead end or each neutral end and adjacent corresponding extension plate.

14. The electrical machine of claim 8 further comprising a thermistor in connection with and configured to sense a temperature of the neutral bar.

15. A terminal block for an electric machine comprising:
bus bars, each configured to connect to lead ends of electrical windings;
a neutral bar configured to connect to neutral ends of the electrical windings; and
an insulating material (i) encapsulating the bus ban and the neutral bar, (ii) defining orifices extending from a first outer surface of the insulating material to one of the bus bars or the neutral bar, and (iii) defining slots extending from a second outer surface of the insulating material to one of the bus bars, wherein (i) each bus bar is spaced apart from and not connected to other bus bars within the insulating material, (ii) each bus bar is spaced apart from and not connected to the neutral bar within the insulating material, (iii) each orifice is configured to receive one lead and or one neutral end, and (iv) each slot is configured to receive a terminal connector.

16. The terminal block of claim 15, wherein the orifices taper from the first outer surface of the insulating material to facilitate insertion of the lead ends and the neutral ends into the orifices.

17. The terminal block of claim 15, wherein the insulating material further defines a secondary orifice configured to receive a thermistor configured to sense a temperature of the neutral bar.

18. The electrical machine of claim 7, wherein the thermistor includes a thermistor element and a housing, and wherein the housing engages the insulating material to position the thermistor element such that the thermistor element contacts the at least one neutral bar.

19. The electrical machine of claim 14, wherein the thermistor includes a thermistor element and a housing, and wherein the housing engages the insulating material to position the thermistor element such that the thermistor element contacts the neutral bar.

20. The terminal block of claim 17, wherein the thermistor includes a thermistor element and a housing, and wherein the housing engages the insulating material to position the thermistor element such that the thermistor element contacts the neutral bar.

* * * * *